(12) United States Patent
Wilkes

(10) Patent No.: US 7,856,399 B2
(45) Date of Patent: Dec. 21, 2010

(54) LINKING A MERCHANT ACCOUNT WITH A FINANCIAL CARD

(75) Inventor: W. Bradley Wilkes, Alpine, UT (US)

(73) Assignee: Propay USA. Inc., Orem, UT (US)

( * ) Notice: Subject to any disclaimer, the term of this patent is extended or adjusted under 35 U.S.C. 154(b) by 1560 days.

(21) Appl. No.: 10/358,751

(22) Filed: Feb. 5, 2003

(65) Prior Publication Data

US 2004/0153399 A1 Aug. 5, 2004

(51) Int. Cl.
*G06Q 40/00* (2006.01)
(52) U.S. Cl. .............................. 705/39; 705/42; 705/44
(58) Field of Classification Search .................. 705/39, 705/42, 44
See application file for complete search history.

(56) References Cited

U.S. PATENT DOCUMENTS

| | | | | |
|---|---|---|---|---|
| 6,018,717 | A * | 1/2000 | Lee et al. ....................... | 705/13 |
| 6,169,974 | B1 | 1/2001 | Baumgartner et al. ......... | 705/39 |
| 6,226,624 | B1 | 5/2001 | Watson et al. ................. | 705/44 |
| 6,490,568 | B1 | 12/2002 | O'Mara et al. ................ | 705/39 |
| 6,529,880 | B1 | 3/2003 | McKeen et al. ............... | 705/17 |
| 6,721,716 | B1 | 4/2004 | Gross | |
| 7,104,443 | B1 * | 9/2006 | Paul et al. ..................... | 235/380 |
| 7,184,980 | B2 | 2/2007 | Allen-Rouman et al. | |
| 2002/0004772 | A1 * | 1/2002 | Templeton et al. ............ | 705/35 |
| 2002/0010640 | A1 | 1/2002 | Dutta et al. ................... | 705/26 |
| 2002/0169720 | A1 * | 11/2002 | Wilson et al. ................. | 705/44 |
| 2002/0181710 | A1 | 12/2002 | Adam et al. | |
| 2003/0004827 | A1 * | 1/2003 | Wang .......................... | 705/26 |
| 2003/0028495 | A1 | 2/2003 | Pallante | |
| 2003/0093703 | A1 * | 5/2003 | Oliver et al. ................. | 713/400 |
| 2003/0097303 | A1 * | 5/2003 | Agee et al. .................... | 705/19 |
| 2003/0140007 | A1 * | 7/2003 | Kramer et al. ................ | 705/40 |
| 2003/0158844 | A1 | 8/2003 | Kramer et al. | |
| 2003/0191945 | A1 | 10/2003 | Keech | |

(Continued)

FOREIGN PATENT DOCUMENTS

CA 2456938 3/2010

(Continued)

OTHER PUBLICATIONS

Webcommerce Help Guide, www.webcom.com; (internet document), downloaded electronically Dec. 26, 2002.

(Continued)

*Primary Examiner*—Jagdish N Patel
*Assistant Examiner*—Kevin Poe
(74) *Attorney, Agent, or Firm*—Workman Nydegger

(57) ABSTRACT

Systems and methods for linking a merchant card with a merchant account. A financial institution that issues the merchant card to a merchant acts as both issuer and acquirer for the merchant. The merchant uses the merchant card to accept other financial cards as payment. Funds due the merchant are added to an available balance of the merchant card rather than depositing the funds in a settlement account. The funds can be added to the available balance before the transactions settle and can be accessed by the merchant. The financial institution also authorizes transactions when the merchant uses the merchant card as a regular cardholder to make payment. The merchant name can be changed on a per transaction basis if desired.

11 Claims, 3 Drawing Sheets

U.S. PATENT DOCUMENTS

| | | |
|---|---|---|
| 2003/0235184 A1 | 12/2003 | Dorenbosch et al. |
| 2004/0024700 A1* | 2/2004 | Petigny ....................... 705/39 |
| 2004/0030647 A1 | 2/2004 | Hansen et al. |
| 2004/0048658 A1* | 3/2004 | Sanders ....................... 463/25 |
| 2004/0078276 A1 | 4/2004 | Shimogori |
| 2004/0111343 A1 | 6/2004 | Lindvall et al. |
| 2004/0127256 A1* | 7/2004 | Goldthwaite et al. ........ 455/558 |
| 2004/0153399 A1 | 8/2004 | Wilkes |
| 2004/0153410 A1* | 8/2004 | Nootebos et al. .............. 705/44 |
| 2005/0246253 A1* | 11/2005 | Barthelemy ................. 705/35 |
| 2006/0116955 A1* | 6/2006 | Strayer et al. ................. 705/39 |
| 2007/0005496 A1* | 1/2007 | Cataline et al. ............... 705/40 |

FOREIGN PATENT DOCUMENTS

| | | |
|---|---|---|
| WO | WO02/45278 | 6/2000 |
| WO | WO00/67216 | 11/2000 |

OTHER PUBLICATIONS

U.S. Appl. No. 10/660,147, filed Sep. 10, 2003, Wilkes et al.
Webcommerce Help Guide, www.webcom.com; online Dec. 26, 2002.
U.S. Appl. No. 10/660,147, filed Sep. 6, 2007, Office Action.
U.S. Appl. No. 10/660,147, filed Jan. 28, 2008, Office Action.
U.S. Appl. No. 10/660,147, filed May 1, 2008, Office Action.
U.S. Appl. No. 10/660,147, filed Nov. 20, 2008, Office Action.
U.S. Appl. No. 10/660,147, filed May 11, 2009, Office Action.
TakePayment.com(as of Feb. 3, 2003) http://web.archive.org/web/20030202013748/http://takepayment.com, rerieved Sep. 29, 2009.
U.S. Appl. No. 10/660,147, mailed Jan. 5, 2010, Final Office Action.

\* cited by examiner

LINKING A MERCHANT ACCOUNT WITH A FINANCIAL CARD

CROSS-REFERENCE TO RELATED APPLICATIONS

Not applicable.

BACKGROUND OF THE INVENTION

1. The Field of the Invention

The present invention relates to systems and methods for linking a merchant account with a financial card. More particularly, the present invention relates to systems and methods for enabling entities that do not have a bank account to accept financial cards as payment by linking a financial card with a merchant account.

2. Background and Relevant Art

Financial cards come in a variety of different types from traditional credit cards and debit cards to stored value cards. Issuers and acquirers that are members of an association or jointly owned corporation make it possible for these types of financial cards to be used to make payments. The association is an entity to administers and promotes financial cards. Some associations promote one or more brands of financial cards. Issuers are usually financial institutions that issue cards to individuals or entities (businesses) that thereby become cardholders. Acquirers maintain relationships with merchants that enable the merchants to accept financial cards from cardholders.

Today, using a financial card in a transaction requires a person to establish a relationship with an issuer and become a cardholder. Becoming a cardholder is a process that is well known to a large number of people and many people receive solicitations to become cardholders almost every day. Generally, a person completes a simple application and provides the completed application to an issuer. In the case of an application for a credit card, the issuer examines the credit of the applicant, establishes a credit limit, and issues a card to the person. After the cardholder receives his or her card from the issuer, the cardholder can use his or her card to purchase goods and/or services as long as the merchant accepts that particular card.

After people become cardholders, they are able to use their cards in financial transactions to make payment. While people are able to use their cards to purchase goods/services, they are unable to accept cards as payment in similar transactions. The ability to accept cards as payment requires the person accepting the card to have a merchant account with an acquiring financial institution. Unfortunately, merchant accounts are only available to businesses that become merchants as defined by the association. To accept cards and become a merchant, the business must establish a relationship with an acquirer that enables the business to accept cards in the business's transactions. This is primarily accomplished through a merchant account that the acquirer establishes for the business that qualifies as a merchant.

To obtain a merchant account with an acquirer and become a merchant, the business is often asked to provide details regarding their business practices. The business is often required to describe the goods and services being sold as well as how the goods and services are delivered to customers. With this information, the acquirer assists the business identify a card processing system that best serves the needs of the business.

Obtaining a merchant account and becoming a merchant also require the business to have an account at a financial institution where funds can be deposited. The association is responsible for debiting the funds from the issuer's Bank Identification Number (BIN) account and depositing the funds into the acquirer's BIN account. For this reason, a merchant is required to have a settlement account at a financial institution where the funds can be deposited. A typical example of a settlement account is a checking account or a savings account at a bank. The settlement account must be accessible to the acquirer through the use of the automated clearing house (ACH) network and the business provides an account routing number and an account number. If the business does not have an account, then the business cannot obtain a merchant account and is therefore unable to accept cards as payment for their goods and services and does not qualify as a merchant as defined by the association. Usually, a merchant account is not created unless the prospective merchant can identify an account for receiving funds.

Thus, businesses often have difficulty in obtaining a merchant account with an acquirer, but the inability to procure a merchant account with an acquirer is also problematic to a significant number of individuals. As previously indicated, one of the problems faced by individuals is that merchant accounts require that the individual be a merchant. Even if individuals could overcome this obstacle, some individuals would not qualify to become merchants because they do not trust financial institutions and do not have an account with any financial institution. These individuals, as well as businesses that do not have a settlement account with any financial institution, are therefore unable to obtain a merchant account even though they may prefer to accept financial cards as payment. Other individuals or businesses would like the ability to have accessible funds without having to go to the bank and deposit a check and/or make a withdrawal.

Many attempts have been made to make funds more accessible to individuals who do not have an account with a financial institution. Payroll cards, for example, are cards whose value is tied to the user's payroll. Instead of issuing a check, the available balance of the payroll card is increased. This does not, however, enable the holder of the payroll card to accept credit cards, debit cards and other financial cards as payment.

BRIEF SUMMARY OF THE INVENTION

These and other limitations are overcome by the present invention which relates to systems and methods for enabling a merchant such as an individual or other entity to accept financial cards for payment without requiring the merchant to have an account at a financial institution where the funds or amount owed to the merchant can be deposited by the acquirer. The present invention further relates to systems and methods for linking a financial card with a merchant account. The financial institution issuing the card that is linked to a merchant account often functions as both the issuer and the acquirer. However, the issuer and the acquirer can also be separate financial institutions.

The merchant cardholder can therefore use the card to purchase goods and services and the financial institution authorizes those transactions based on an available balance of the card and/or a credit limit of the merchant cardholder. The merchant cardholder can also use the card to accept payment from other cards. In this situation, the financial institution, acting as an acquirer, makes these funds available as stored value or as an available balance on the merchant card. In one embodiment, these funds may also have the ability to draw interest for the merchant if unused.

One advantage of linking a card with a merchant account is that the financial institution that is acting as the issuer/acquirer is only required to perform a single underwriting for both the merchant account and the merchant card account. Also, the financial institution is able to maintain unused funds that correspond to the available balance instead of transferring those funds to a separate account at another financial institution reducing the risk of offering card acceptance to these merchants. Risk is reduced because the acquiring financial institution does not need to settle the funds to another financial institution but rather it makes these funds available to the merchant cardholder, with recourse rights, as the result of a bona fide transaction by another acquiring financial institution or ATM network.

Another advantage of linking a card with a merchant account is that when the card is used to accept payment from another card, the authorized funds can be made part of the available balance even though the authorized funds have not cleared through the association at the end of a business day. The merchant cardholder thereby may have immediate access to funds from authorized transactions. This single-step funds availability capability is not possible with the current multiple-step financial card clearing and settlement process.

For example, during a typical day, a merchant may conduct several transactions with various cardholders. Each transaction is authorized and, at a particular time, the transactions are captured. Later, the transactions are cleared and settled. Previously, funds have been available for use by the merchant only after the transactions have settled. Linking a card with a merchant account enables the funds to be made available to the merchant when the transactions are authorized. Currently, the merchant is required to wait at least 48 hours before the funds are available for use by the merchant: 24 hours for the fund to clear and 24 hours for the funds to settle. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
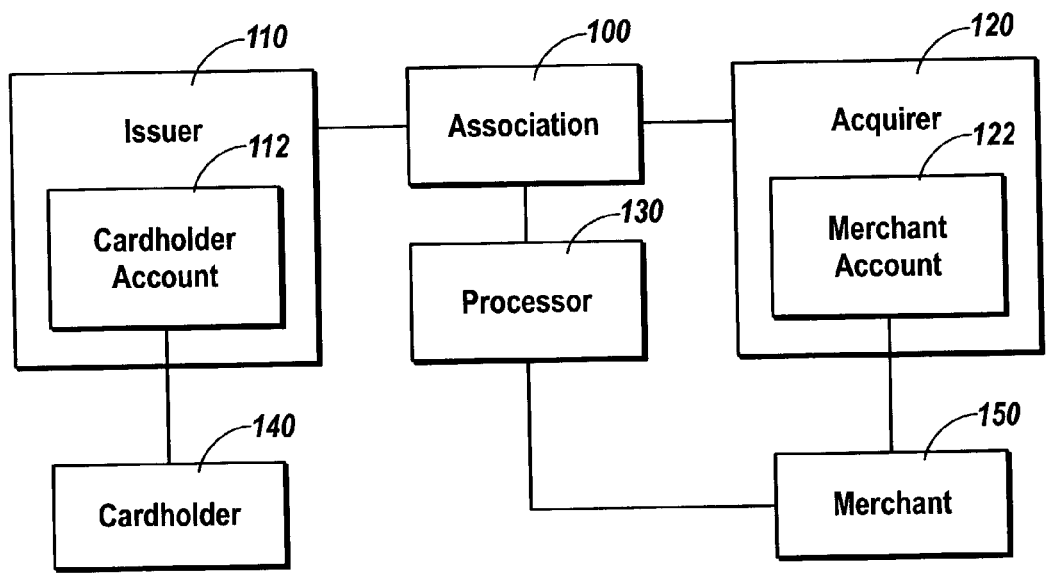
FIG. 1 illustrates an exemplary environment for implementing the present invention and illustrates relationships between cardholders, issuers, acquirers, and merchants.

Transactions that utilize financial cards such as credit cards and debit cards typically begin when a cardholder presents a card to a merchant. The merchant requests an authorization from the issuer of the card and completes the transaction if an authorization is not declined. This process is repeated by the merchant for each transaction. At the end of the day, the transactions of the merchant are captured. Next, the transactions are cleared and money authorized by the issuers is transferred from the BIN account of the issuer to the BIN account of the acquirer that has a relationship with the merchant. Finally, the transactions are settled and funds are delivered to the merchant less any settlement fees.

As previously described, this process occurs only if the merchant has an account where the funds can be deposited by the acquirer. The present invention, however, enables the merchant to receive the funds using a financial card that is associated with the merchant account. The present invention thus relates to systems and methods for linking a merchant account with a financial card. Funds owed to the merchant are added to an available balance of a merchant card that is linked with the merchant account. Linking a merchant account with a financial card eliminates the requirement of having the merchant maintain a checking or other account where funds can be deposited by the acquirer. Instead, the funds are made available to the merchant on the merchant card.

In one embodiment, the funds become stored value on the merchant card. Alternatively, the funds can be applied to a credit balance of the merchant card and the like. The present invention also makes the funds available on the merchant card as soon as a transaction where the merchant receives another card as payment is authorized. Linking the merchant card to the merchant account eliminates the need to wait until the transaction has cleared and settled because the acquirer is no longer required to deposit the funds to an outside settlement account of the merchant. Instead, the acquirer can maintain the funds in the BIN account and make internal adjustments to appropriate BIN accounts in one embodiment.

Because the authorized funds are immediately available on the merchant card, the merchant can use the card, for example, at an ATM (Automatic Teller Machine) to withdraw cash using an encrypted personal identification number (PIN). The merchant is also able to use the merchant card to purchase goods/services from other merchants that accept the card. In one embodiment, the primary method of adding funds to an available balance of the merchant card is by accepting cards from other cardholders. The merchant can thereby operate a business and process financial transactions without having, for instance, a checking, savings, or other settlement account.

Linking a card to a merchant account provides other advantages. For example, only a single application and a single underwriting are required when the merchant applies for a merchant account. Upon approval, the merchant account is created and an associated card is issued to the merchant. Linking a card to a merchant account also enables the name of the merchant to be changed on a per transaction basis. In addition, the merchant can accept cards from customers or other third parties by obtaining an authorization over the telephone, the Internet, wireless phone, etc. For example, the merchant typically enters the card number on the telephone after calling an authorization number. If using the Internet, the card number is usually entered in an entry box provided by the issuer for the purpose of authorizing a transaction.

Linking a merchant account with a merchant card also has the advantage of extending the benefits of a merchant account to those who traditionally have not been considered to be merchants. For example, those who offer labor for hire or are involved in informal economic activity can have merchant accounts. In addition, the present invention can be used to conveniently transfer funds electronically from one person to another person as the funds can be incorporated into an available balance of the merchant card. For instance, friends, family and other acquaintances can electronically transfer funds using the present invention.

FIG. 1 is a block diagram that illustrates an example of the various entities that are involved with financial cards and that process card transactions. The association 100 is an business, corporation, jointly owned corporation, or other entity that administers, promotes, and markets certain brands of cards. Exemplary associations include MasterCard International, Incorporated, and Visa U.S.A., Inc. The members of the associations include both issuers and acquirers. In FIG. 1, the issuers are represented by the issuer 110 and the acquirers are represented by the acquirer 120.

The issuer 110 is typically a financial institution such as a bank or an agent of a bank that has issued a financial card to a cardholder 140. The cardholder 140 can be an individual, a business, or other entity. The cardholder 140 receives a card from the issuer 110 and the name of the cardholder 140 is usually embossed on the card. The issuer 110 maintains a cardholder account 112 that reflects the status of the card given to the cardholder 140. A debit card, for example, is often associated with a checking account of the cardholder 140 while a credit card may be associated with a line of credit that has been extended to the cardholder 140 by the issuer 110.

Similarly, the acquirer 120 is also a financial institution that maintains a relationship with a merchant 150. To become a merchant, the merchant 150 establishes a merchant account 122 with the acquirer 120. The acquirer 120 receives card transactions from the merchant 150 and initiates clearing and settlement of the card transactions submitted by the merchant 150. The processor 130 provides infrastructure that enables the various entities to communicate and exchange data relevant to the card transactions that occur between cardholders and merchants. Much of the data transfer is performed by the processor 130.

Figure 2:
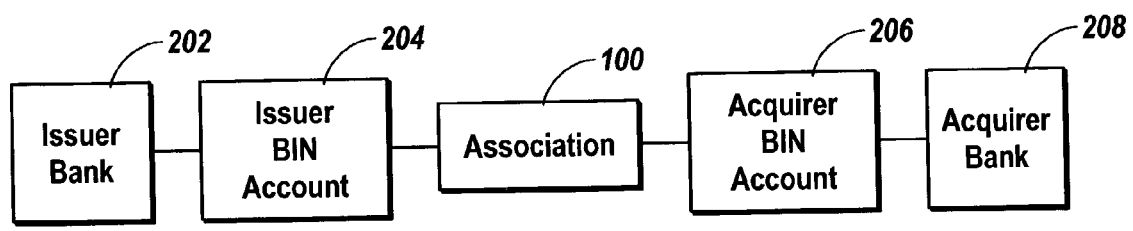
FIG. 2 is a block diagram that illustrates the use of BIN accounts and the interaction between an association and the members of the association.

FIG. 2 illustrates the relationships between issuers and acquirers in more detail. In FIG. 2, the issuer bank 202 has an issuer BIN account 204 with the association 100. Similarly, the acquirer bank 208 also has an acquirer BIN account 206 with the association 100. The BIN accounts are typically assigned by the association 100 to the members of the association, which include both issuers and acquirers. Each BIN account number identifies parts of both card numbers and/or merchant account numbers. When a cardholder initiates a transaction with a merchant and the issuer bank 202 authorizes the transaction, the issuer BIN account 204 is debited by the amount of the transaction. The issuer bank 202 is thereby responsible for the amount debited. The issuer bank 202 is reimbursed by the cardholder.

When a transaction with the cardholder is received to the acquirer bank 208, the acquirer BIN account 206 is credited with the amount of the transaction. When the issuer BIN account 204 and the acquirer BIN account 206 are cleared, funds are typically transferred from the issuer bank 202 to the acquirer bank 208. During settlement, the acquirer bank 208, as previously indicated, transfers the amount owed to the merchant to a settlement account of the merchant, less settlement fees. In the present invention, however, the funds are made available to a card of the merchant that is associated with the merchant account maintained by the acquirer bank 208. The amount owed to the merchant can thus be viewed as stored value or as an available balance. The acquirer bank 208 does not have to transfer the funds to an external settlement account, but is allowed to maintain the funds that correspond to the available balance of the card associated with the merchant account.

The BIN accounts of the members of the association are thus used to clear and settle funds. The issuer BIN account 204 and the acquirer BIN account 206 reflect the transactions that occur between cardholders and merchants. The issuer BIN account 204 indicates the sum of money that the issuer bank 202 must pay while the acquirer BIN account 206 indicates the sum of money that the acquirer bank 208 is to receive. During clearing, funds are moved from the issuer BIN account 204 to the acquirer BIN account 206. During settlement, the available balance of the merchant card is increased to reflect the funds that have been received from the issuer bank 202. Thus, the merchant is not required to have an external settlement account and the settled funds are available to the linked card in the form of an available balance or stored value in one embodiment.

Figure 3:
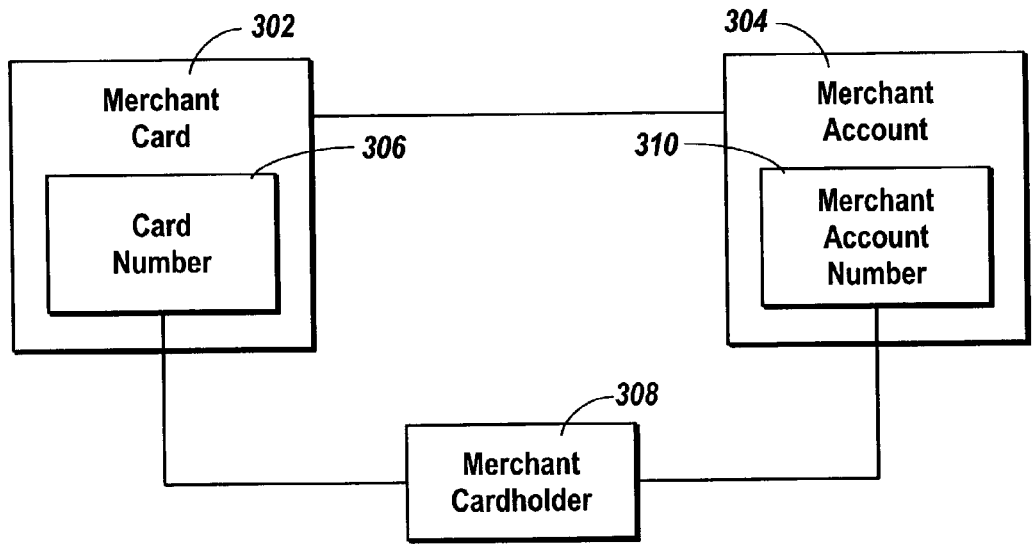
FIG. 3 illustrates a merchant account that is linked with a financial card.

FIG. 3 more fully illustrates a relationship between a merchant account 304 and a card 302. The card 302 has a card number 306 that, in this embodiment, is associated with or identifies a unique merchant account 304. The merchant account 304 also has a merchant account number 310 that is associated with or identifies a unique card 302. The merchant account 122 is assigned to the merchant cardholder 308, who also holds the card 302. Typically, the merchant cardholder 308 is a merchant as understood by the association 100 illustrated in FIG. 1. Often, a portion of the merchant number 304 is embossed on the card 302.

The merchant account 304 enables the cardholder 308 to receive funds from authorized transactions. For funds owed to the merchant, the acquirer increases the available balance of card 302 and the merchant cardholder 308 can use or access the funds represented by the available balance when using the card 302 to make payment to other merchants. The funds are typically maintained by the acquirer bank, but are included in the available balance of the card 302. When the merchant cardholder 308 uses the card 302 to purchase, the same institution that acts as an acquirer also acts as an issuer and authorizes the purchase by comparing the amount being authorized with the available balance of the card 302.

Figure 4:
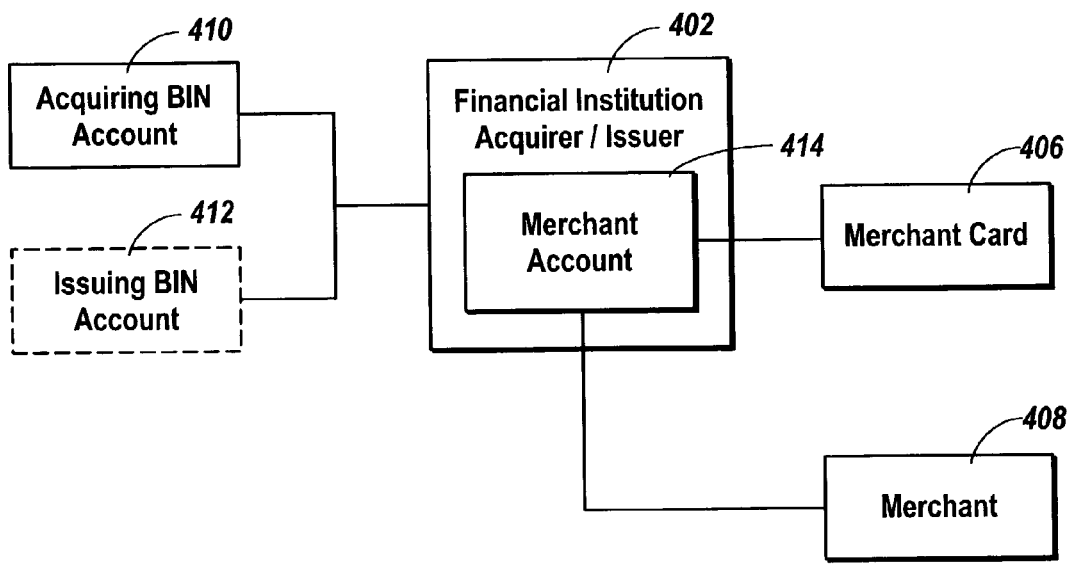
FIG. 4 illustrates a financial institution that acts as both an issuer and an acquirer for a merchant account that is linked with a financial card.

FIG. 4 is a block diagram that illustrates an example of a merchant account that is linked with a card. The financial institution 402 has issued a merchant card 406 to the merchant 408. The financial institution 402 has also established a merchant account 404 for the merchant 408 and linked the merchant account 404 to the card 406. Thus, the financial institution 402 is acting as both the issuer and the acquirer in this example.

The financial institution 402 has an acquiring BIN account 410 for the role of acquirer and an issuing BIN account 412 for the role of issuer. In one embodiment, the acquiring BIN account 412 are linked. The issuing BIN account 412 reflects authorizations that are created when the merchant 408 uses the card 402 as payment. The acquiring BIN account 410 reflects the transactions that are payable to the card 406 of the merchant 408. In other words, the acquiring BIN account 410 reflects an amount owed to the merchant and the issuing BIN account 412 reflects an amount ultimately owed by the merchant. During clearing and settlement, the issuing BIN account 412 and the acquiring BIN account 410 are simply adjusted, settlement fees are deducted, and the financial institution 402 does not have to transfer funds to an external settlement account. Rather, the settled funds, as previously described, are added to the available balance of the card 406. Thus, the BIN accounts 410 and 412 are monitored and the available balance of the card 406 is adjusted as the merchant uses the card 406 to make payment and to receive payment. When the card 406 is used to receive payment, an authorized amount is added to the available balance and when the card 406 is used to make payment, the authorized amount is deducted from the available balance. In one embodiment, the available balance can be combined with a line of credit.

As previously indicated, funds due the merchant 408 are made available to the merchant through the card 406 instead of having the financial institution 402 transfer funds to an account at another financial institution. The funds owed to the merchant 408 can thus be held by the financial institution 402. This has the advantage of increasing the financial strength and worth of the financial institution 402.

The present invention thus enables a merchant or other individual to accept financial cards such as debit cards and credit cards as payment. For example, when a cardholder presents a card as payment, the merchant can authorize the amount of the transaction using the telephone, the Internet, and the like. The financial institution that issued the card of the cardholder authorizes the transaction. After authorization, the card 406 has the amount of the transaction (less settlement fees) added to the available balance of the card 406 by the acquirer. Alternatively, the merchant may be required to wait until the transaction settles before the acquirer adds the funds to the available balance of the card 406. In this example, the funds are made available for use by the merchant as soon as they are authorized.

In another embodiment, the financial institution may examine the BIN account 410 periodically to determine when funds payable to the merchant have been authorized and then make those funds available to the merchant in the form of stored value or credit. This can occur, for example, hourly, daily, and the like. The advantage is that the funds are available before they would normally settle. In one embodiment, the available balance of the card 406 is determined by the number and amount of card transactions accepted by the merchant 408.

In alternative embodiments, the card and the associated merchant account may have certain restrictions. For example, the merchant account 404 that is linked to the card 406 may only be allowed to process a certain dollar volume of transactions for a specified period of time. The merchant account 404 and the linked card 406 may also have a limit on the amount of a particular transaction.

Because the card also has the characteristics of cards that are issued by issuers, the merchant is able to use the card just as other cardholders that have cards from other issuers use their cards. The merchant, for example, can access the available balance using an ATM. A limit may be placed, however, on the amount that the merchant can withdraw in a given transaction or over a specified period. The merchant can access the available balance at other merchants that accept the card 402 of the merchant 408 as payment. While the card 406 issued to the merchant 408 and associated with the merchant account 404 can be used by the merchant just like other financial cards such as credit and debit cards, the card 406 also has an available balance that can increased when the merchant accepts another financial card as payment.

When the merchant accesses the available balance on the card 406 and used the card as a typical cardholder, the financial institution 402 generates an authorization. This is done by comparing the amount of authorization request against the available balance. If the available balance is too low, then an authorization may be declined. Alternatively, the card 406 may also have a credit limit that may permit the authorization to be issued when the available balance is insufficient. Also, the available balance may be decreased by any amount that is owed by the merchant as reflected in the issuing BIN account.

FIG. 4 illustrates one example of the relationships between a financial institution, a merchant card and a merchant. In FIG. 4, the financial institution acts as both the acquirer and the issuer. However, it is possible for the acquirer and the issuer to be separate financial institutions. In addition, the acquiring BIN account 410 and the issuing BIN account 412 can also be a single BIN account.

In another embodiment, a processing entity may act as an intermediary between the issuing financial institution and the acquiring institution. The processing entity can process all transactions related to the merchant card and provide the acquiring financial institution and the acquiring institution with details relating to the various transactions.

Figure 5:
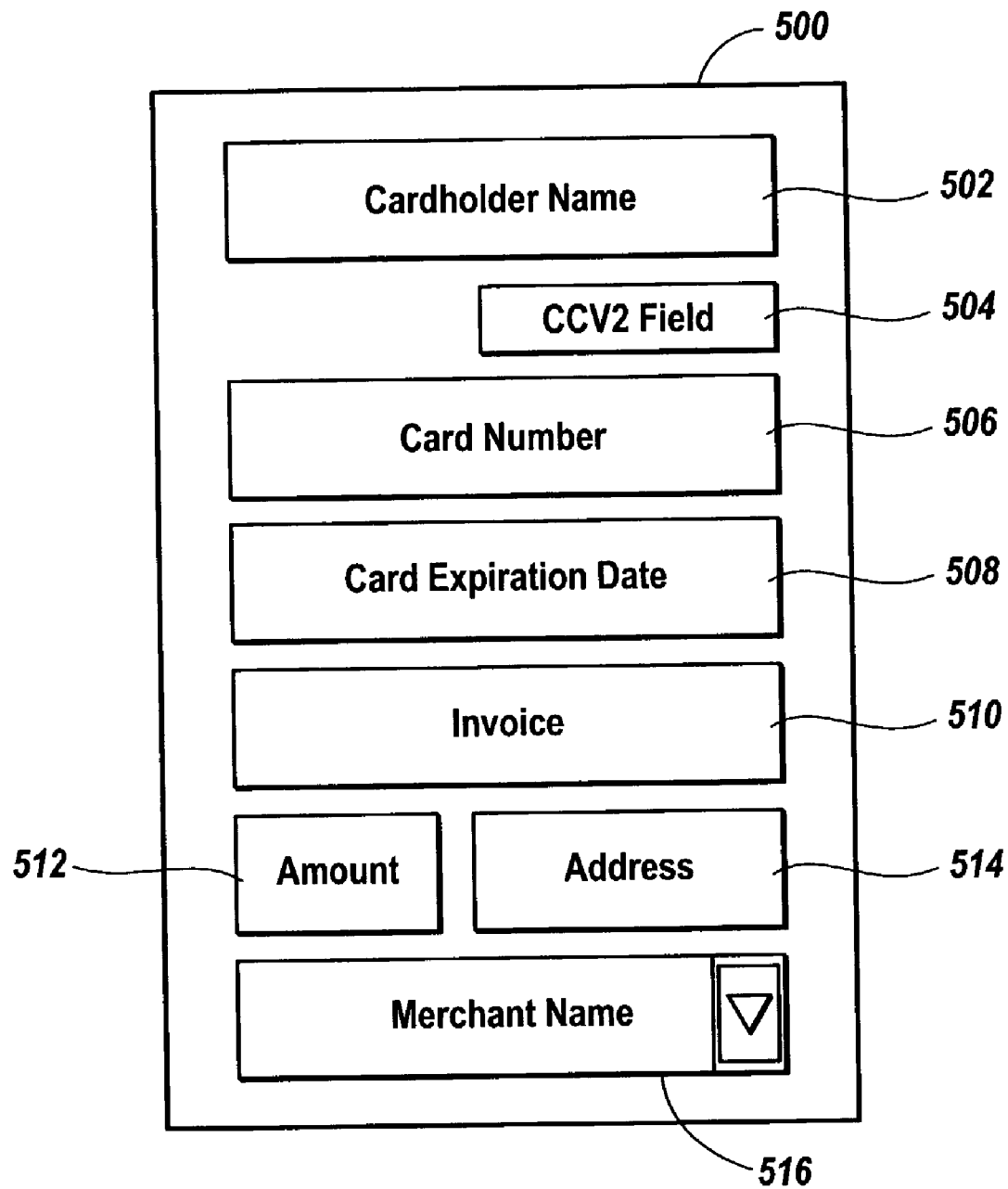
FIG. 5 is a block diagram that illustrates how a merchant can change the merchant name on a per transaction basis.

FIG. 5 is a block diagram that further illustrates the ability of a merchant to control the merchant name associated with a particular transaction. In this example, a merchant is using a merchant card to accept payment and is in the process of requesting an authorization for a card of another cardholder used to make payment to the merchant. In FIG. 5, the merchant accesses a website 500 and provides information related to the transaction and to the paying card. The merchant enters the cardholder name 502, the card number 506, the CCV2 field 504 (if necessary), the card expiration date 508, an invoice number 510, an amount 512 of the transaction, and the cardholder's address 514. The information entered for a particular transaction can vary and may be dependent on the issuer of the cardholder's card.

FIG. 5 also illustrates drop down list 516 on the website 500. In this example, the drop down list 516 permits the merchant to select a merchant name from the merchant names stored in the drop down list 516. The merchant name selected from the drop down list is associated with the transaction. The selected merchant name, for example, appears on the cardholder's statement. The merchant name can also be selected using a telephone or other mechanism.

The merchant names in the drop down list 516 were previously supplied by the merchant. Alternatively, the drop down list 516 may permit the merchant to enter a new merchant name. The merchant names in the drop down list can also be changed by the merchant as needed. This gives the merchant control over the merchant name for a given transaction. This provides a merchant with flexibility in the transactions that are conducted. For example, the merchant can receive money from a friend or accept payment for the merchant's business on the same card while reflecting a different merchant name for each transaction.

One significant benefit of this feature of the invention is that it gives the merchant a single merchant account with the ability to be used for multiple purposes, either business or personal use, while identifying each transaction appropriately to the cardholder, or payor, associated with the transaction. Thus, when the individual cardholders who have engaged in transactions with the merchant receive their monthly statements, the transactions that have been conducted with the merchant are identified in the statements using the appropriate merchant name selected by the merchant. This allows the transaction to be easily recognized by the cardholder who has received the statement. Moreover, clear identification of the merchant using one of the multiple merchant names is important, because cardholders tend to dispute transactions whose source is not readily identifiable on the cardholder statement. Thus, the source of the transaction and the identify of the merchant can be included in the statements without the need for the merchant to establish a different merchant account for each the multiple merchant identities.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Although not required, the invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer-implemented system that includes one or more modules for generating and managing a merchant account of a financial institution, wherein the merchant account is not required to be linked to a checking account, savings account, or settlement account of an owner of the merchant account, a method for enabling the merchant account to accept financial cards as payment, the method comprising:

using a financial module associated with the financial institution and executed by a computer, linking, by the computer, the merchant card to the merchant account, wherein the merchant account is not required to be linked to a checking account, savings account or settlement account associated with an owner of the merchant account;

accepting, by the computer, a financial card of a particular cardholder in a transaction associated with the merchant account;

adding, by the computer, an amount authorized by an issuer of the financial card of the particular cardholder of the particular transaction to an available balance of the merchant account;

making the available balance of the merchant account immediately available for use as stored value on the merchant card linked to the merchant account without transferring funds to or from a checking account, savings account, or settlement account associated with the owner of the merchant account and without waiting until the transaction has settled with the issuer of the financial card of the particular cardholder; and while the available balance of the merchant account is available to the merchant for use as stored value on the merchant card linked to the merchant account, settling, by the computer, the transaction with the issuer of the financial card of the particular cardholder.

2. A method as defined in claim 1, wherein linking the merchant card to the merchant account comprises associating a merchant number of the merchant account uniquely with a merchant card number of the merchant card.

3. A method as defined in claim 1, further comprising the financial institution acting as both an issuer and an acquirer.

4. A method as defined in claim 1, wherein adding an amount authorized by an issuer of the financial card of the particular cardholder of the particular transaction to an available balance of the merchant account further comprises deducting settlement fees from the available balance.

5. A method as defined in claim 1, further comprising maintaining an acquiring BIN account that includes transactions where the merchant accepts other financial cards for payment, wherein the acquiring BIN account includes an amount owed to the merchant before settlement.

6. A method as defined in claim 5, further comprising adding the amount owed to the merchant to the available balance either before settlement of the transactions or after settlement of the transactions.

7. A method as defined in claim 5, further comprising maintaining an issuing BIN account that includes transactions where the merchant uses the merchant card to make payment to another merchant, wherein the issuing BIN account includes an amount owed by the merchant.

8. A method as defined in claim 7, further comprising deducting the amount owed by the merchant from the available balance of the merchant card.

9. A method as defined in claim 1, wherein the merchant account is used to receive payment from other cardholders, further comprising changing a merchant name on a per transaction basis.

10. A method as defined in claim 1, further comprising at least one of:

setting an amount limit on each transaction where the merchant card is used to accept payment from the financial institution;

setting a per day limit on transactions where the merchant card is used to accept payment from the financial institution; and setting a limit on a withdrawal amount when the merchant accesses the available balance of the merchant card to make payment.

11. A computer program product having computer-executable instructions executable by a computing device to perform operations comprising:

linking a merchant card to a merchant account of a financial institution, wherein the merchant account is not required to be linked to a checking account, savings account, or settlement account associated with an owner of the merchant account;

accepting a financial card of a particular cardholder in a transaction associated with the merchant account;

adding an amount authorized by an issuer of the financial card of the particular cardholder of the particular transaction to an available balance of the merchant account;

making the available balance of the merchant account immediately available for use as stored value on the merchant card linked to the merchant account without transferring funds to or from a checking account, savings account, or settlement account associated with the owner of the merchant account and without waiting until the transaction has settled with the issuer of the financial card of the particular cardholder; and while the available balance of the merchant account is available to the merchant for use as stored value on the merchant card linked to the merchant account, settling the transaction with the issuer of the financial card of the particular cardholder.

* * * * *